Dec. 31, 1946.           B. JOHNSEN           2,413,450
RELEASING DEVICE
Filed Nov. 23, 1944
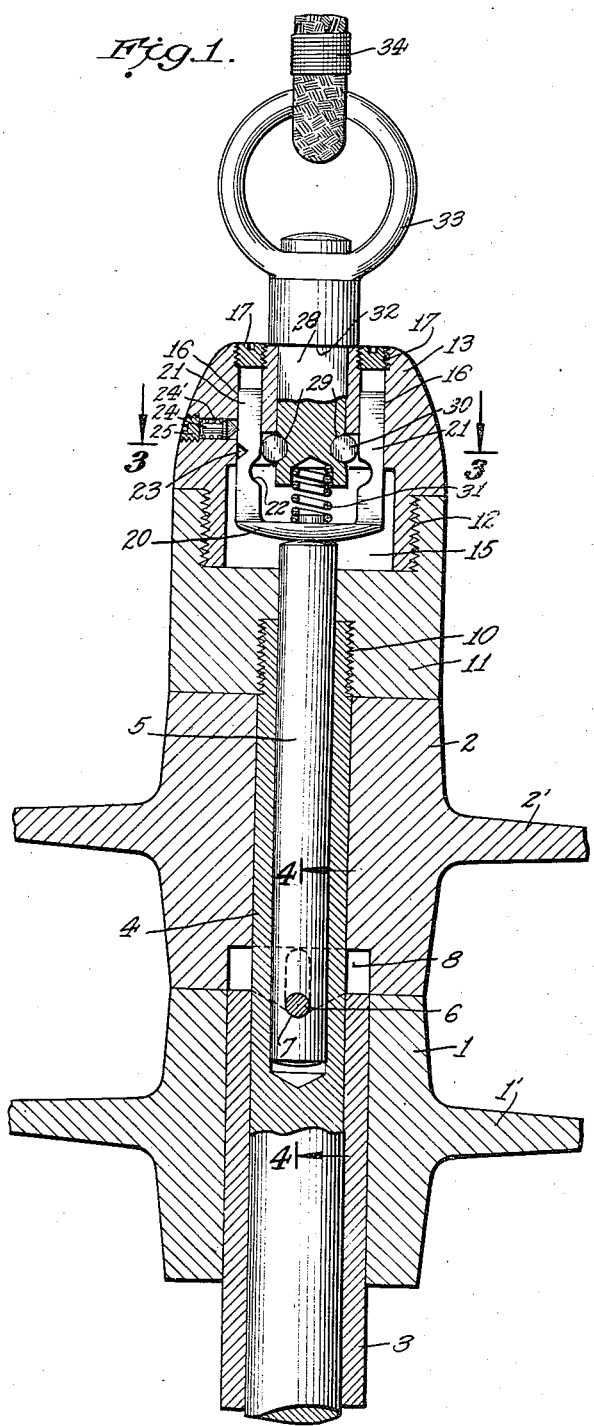
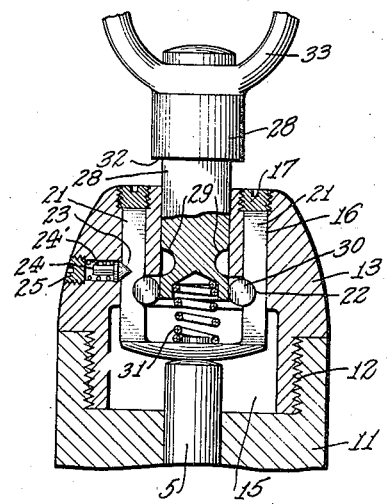
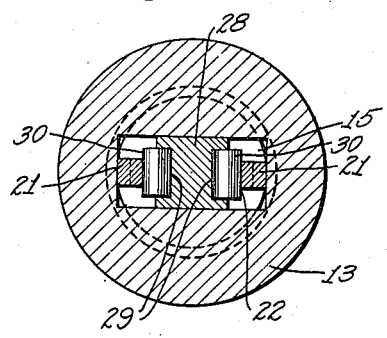
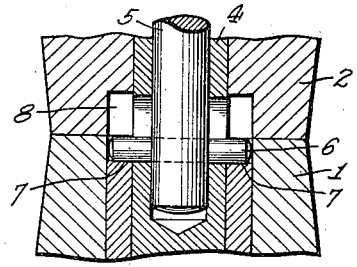
INVENTOR.
BJORNULF JOHNSEN
BY John C. Kerr
ATTORNEY Patented Dec. 31, 1946

2,413,450

UNITED STATES PATENT OFFICE 2,413,450

RELEASING DEVICE

Bjornulf Johnsen, Summit, N. J., assignor to Leonard P. Frieder, New York, N. Y.

Application November 23, 1944, Serial No. 564,838

6 Claims. (Cl. 294—83)

This invention relates to a releasing device which operates automatically. This releasing device is useful for releasing mines from a cable by drawing them through the water or for releasing parachutes that may have been dropped from an airplane, for example.

In carrying out the invention, the releasing mechanism is adapted to be operated by a device which may include propellers that revolve in opposite directions or by a device that is released by impact with the ground.

The invention may be understood from the description in connection with the accompanying drawing of which Fig. 1 is a longitudinal section through an illustrated embodiment of the invention.

Fig. 2 is a section of a portion of Fig. 1 showing parts in a different position.

Fig. 3 is a section along the line 3—3 of Fig. 1, and

Fig. 4 is a section along the line 4—4 of Fig. 1.

In the drawing, reference characters 1 and 2 indicate propellers having blades 1' and 2', these blades being so shaped and located that the propellers revolve in opposite directions when drawn through water.

A hollow shaft 3 is provided to which the propeller 1 is securely attached and a hollow shaft 4 is provided to which the propeller 2 is securely attached, the shaft 4 extending into an opening in the upper end of the shaft 3. A piston 5 extends into an opening in the upper end of the shaft 4. A cross pin 6 is located in the lower portion of the piston 5 and V-shaped notches 7 are provided in the end of the hub of propeller 1 to receive this cross pin 6. A circular opening 8 is provided in the lower end of the hub 2 to receive the cross pin 6. Threaded end 10 of the shaft 4 is screwed into a propeller nut 11. This nut is provided with a threaded recess 12 in which a release housing 13 is screwed. A receiver or opening 15 is provided in the lower portion of the housing 13, this opening communicating with two openings 16 that are shaped like and extend from the opening 15 through the remainder of the housing 13 parallel to the center line of the device. Screw-threaded plugs 17 with screw-driver slots therein are provided for closing the upper ends of the openings 16.

A U-shaped member 20 is provided with arms 21 that extend into the openings 16 from below. Semi-circular transverse grooves 22 are provided along the inner sides of the arms 21 and a conical recess 23 is provided in the outer end of one of the arms 21. A spring-pressed pin 24 is located in a hole in the housing 13 and has a conical head that is adapted to enter the recess 23. A threaded plug 25 with a screwdriver slot therein is provided to keep the pin 24 in place. This pin is pressed inwardly by the spring 24'.

A pin 28 which may be rectangular in cross-section, extends through a corresponding opening through the housing 13. Semi-circular notches 29 are provided in opposite sides of the pin 28, these notches corresponding to the notches 22. Cylindrical rollers 30 are located between the pin 28 and the arms 21.

A compression spring 31 is provided between the bottom of the member 20 and an opening in the lower end of the pin 28. A shoulder 32 on the pin 28 normally bears against the upper surface of the housing 13. A swivel ring 33 is provided for the pin 28 and a cable or parachute line 34 is attached to the ring 33.

The operation of the embodiment of the invention shown in Figs. 1 to 4 is as follows:

The device shown in Figs. 1 to 4 is drawn by the cable 34 which may be attached to an airplane, parachute or other traction device. When the propellers 1 and 2 strike the water one of them is caused to turn in one direction and the other one in the other direction. This causes the pin 6 to ride out of the slot 11, thus moving the piston 5 farther into the housing 13 as indicated in Fig. 2. This causes the semi-circular notches 22 and 29 to become aligned so that the rollers 30 slip into the notches 22 and out of the notches 29, as shown in Fig. 2. Thereupon, the spring 31 pushes the pin 28 out of the housing 13, thus releasing the cable from the torpedo (not shown) that is attached to the shaft 4.

What is claimed is:

1. A releasing device comprising in combination two concentric, cylindrical members, a compression spring and a catch to hold said members in assembled relation, relatively rotatable means for disconnecting said members including relatively rotatable members adapted to be operated by being drawn through water and means actuated by the relative rotation of one of said members with respect to the other one to release said catch.

2. The device of claim 1 in which said relatively rotatable members comprise two propellers.

3. The device of claim 1 in which said catch comprises rollers and one of said cylindrical members is provided with grooves for said rollers.

4. The device of claim 1 in which one of said cylindrical members has a swivel ring attached thereto.

5. A device of the character described comprising a housing, a movable U-shaped member in said housing, a longitudinally movable member between the arms of said U-shaped member, a compression spring between said U-shaped member and said longitudinally movable member, a catch between said longitudinally movable member and said U-shaped member, a piston for moving said U-shaped member to release said catch, and propellers adapted to be driven in opposite directions and move said piston longitudinally when said propellers are drawn through water.

6. The device of claim 5 in which said catch comprises a roller.

BJORNULF JOHNSEN.